(12) United States Patent
Tsumiyama

(10) Patent No.: US 7,392,723 B2
(45) Date of Patent: Jul. 1, 2008

(54) BICYCLE SHIFT CONTROL MECHANISM

(75) Inventor: Akira Tsumiyama, Osaka (JP)

(73) Assignee: Shimano Inc., Osaka (JP)

( * ) Notice: Subject to any disclaimer, the term of this patent is extended or adjusted under 35 U.S.C. 154(b) by 336 days.

(21) Appl. No.: 11/220,419

(22) Filed: Sep. 7, 2005

(65) Prior Publication Data

US 2007/0068313 A1 Mar. 29, 2007

(51) Int. Cl.
*F16C 1/10* (2006.01)

(52) U.S. Cl. .................................... 74/502.2

(58) Field of Classification Search . 74/473.13–473.15, 74/473.3, 500.5, 501.6, 502.2
See application file for complete search history.

(56) References Cited

U.S. PATENT DOCUMENTS

| | | | | |
|---|---|---|---|---|
| 3,943,794 A | * | 3/1976 | Shimada | 74/501.5 R |
| 5,186,072 A | * | 2/1993 | Nagano | 74/501.5 R |
| 5,213,005 A | * | 5/1993 | Nagano, Masashi | 74/502.2 |
| 5,241,878 A | | 9/1993 | Nagano | |
| 5,257,683 A | | 11/1993 | Romano | |
| 5,325,735 A | * | 7/1994 | Nagano | 74/502.2 |
| 5,400,675 A | | 3/1995 | Nagano | |
| 5,479,776 A | * | 1/1996 | Romano | 74/502.2 |
| 5,682,794 A | * | 11/1997 | Shibata | 74/489 |
| 5,802,923 A | * | 9/1998 | Hara | 74/473.13 |
| 6,066,057 A | | 5/2000 | Nakamura et al. | |
| 6,073,730 A | | 6/2000 | Abe | |
| 6,216,078 B1 | | 4/2001 | Jinbo et al. | |
| 6,502,477 B1 | | 1/2003 | Assel | |
| 6,647,823 B2 | | 11/2003 | Tsumiyama et al. | |
| 2004/0005947 A1 | | 1/2004 | Shahana et al. | |
| 2007/0017316 A1 | * | 1/2007 | Tsumiyama | 74/502.2 |

* cited by examiner

*Primary Examiner*—Chong H. Kim
(74) *Attorney, Agent, or Firm*—Global IP Counselors, LLP

(57) ABSTRACT

A bicycle shift position control mechanism is configured to provide a bicycle shifting unit with multiple gear shifting in a single upshift operation or a single downshift operation. The shift position control mechanism that has a wire take up member, a positioning member, a first position maintaining member and a second position maintaining member. The positioning member rotates with the wire take up member between one of a plurality of predetermined shift positions. The first position maintaining member selectively moves between a first engagement position that holds the positioning member in one of the predetermined shift positions and a first disengagement position that releases the positioning member for rotational movement. The second position maintaining member selectively moves between a second engagement position that holds the positioning member in one of the predetermined shift positions and a second disengagement position that releases the positioning member for rotational movement.

18 Claims, 15 Drawing Sheets

BICYCLE SHIFT CONTROL MECHANISM

BACKGROUND OF THE INVENTION

1. Field of the Invention

This invention generally relates to a bicycle control device. More specifically, the present invention relates to a bicycle control device that performs shifting operations.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In particular, control devices for shifting have been extensively redesigned in recent years.

Currently, there are many types of cable operated shifting devices currently being installed on bicycles. For example, some cable operated shifting devices have a pair of shift levers and a cable winding mechanism that rotates via a ratchet mechanism. With conventional cable operated shifting devices of this type, operation of one of the shift lever causes the cable winder to rotate via the ratchet mechanism in one direction by one gear at a time. As a result, the cable is wound around the cable winder, and a shift is made by the shift mechanism from one gear to the next gear. Operation of the other shift lever causes the ratchet mechanism to be released and the cable winder to rotate in the other direction by one gear at a time. As a result, the cable that was wound on the cable winder is played out, and a shift is made in the opposite direction by the shift mechanism.

More recently, some cable operated shifting devices have been developed that allow multiple gear shifts in a single operation of one of the shift levers. When performing multiple gear shifts in a single operation, it is desirable for the rider to know when a shift occurs. Thus, various indexing arrangements have been developed to let the rider know when a shift has occurred. These prior shifting devices with indexing arrangements can be complicated and expensive to manufacture and assemble. Furthermore, these prior shifting devices can be sometimes heavy and/or cumbersome.

In view of the above, it will be apparent to those skilled in the art from this disclosure that there exists a need for an improved bicycle control (shifting) device. This invention addresses this need in the art as well as other needs, which will become apparent to those skilled in the art from this disclosure.

SUMMARY OF THE INVENTION

One object of the present invention is to provide a shift indicating arrangement that let the rider know when a shift has occurred by the resistance in an operating lever of a bicycle control device that can be performed multiple gear shifts in a single gear shifting operation.

Another object of the present invention is to provide a bicycle control device for shifting a bicycle transmission that is relatively simple and inexpensive to manufacture and assemble.

The foregoing objects can basically be attained by providing a bicycle shift control mechanism that has an operating member, a wire take up member, a positioning member, a position maintaining member and a resistance providing structure. The operating member is movable between a first position and a second position. The wire take up member is configured and arranged to rotate about a rotational axis in response to movement of the operating member. The positioning member is configured and arranged to rotate with the wire take up member between one of a plurality of predetermined shift positions. The position maintaining member is configured and arranged to selectively hold the positioning member in one of the predetermined shift positions. The resistance providing structure includes a first contact portion and a second contact portion, with contact occurring between the first and second contact portions when the operating member moves from the first position toward the second position to provide increased resistance in operating the operating member. The resistance providing structure is configured and arranged to provide separate resistance from the positioning member and the position maintaining member.

These and other objects, features, aspects and advantages of the present invention will become apparent to those skilled in the art from the following detailed descriptions, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
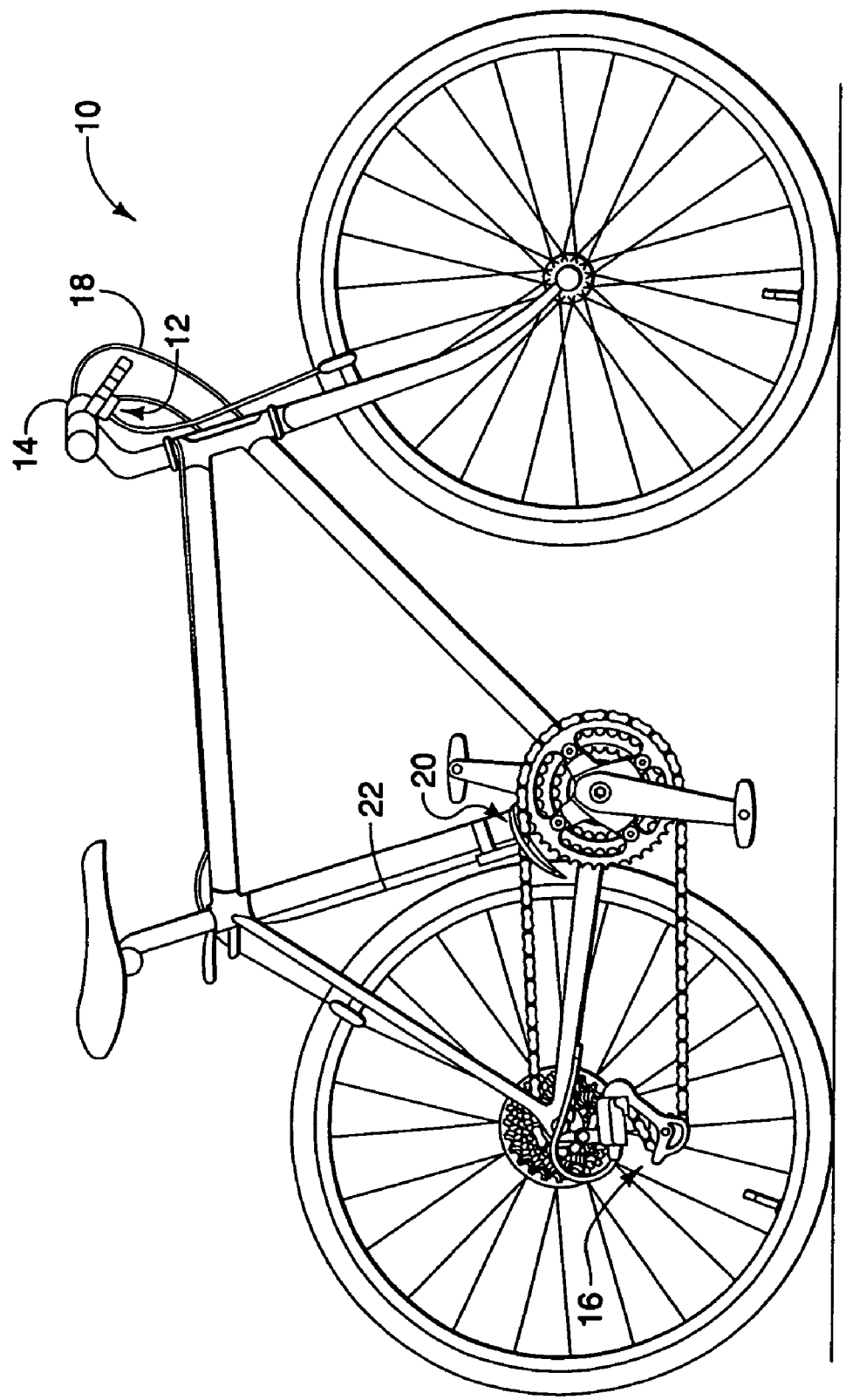
FIG. 1 is a side elevational view of a bicycle equipped with a pair of control devices (only one shown) in accordance with a first embodiment of the present invention.

Referring initially to FIG. 1, a bicycle 10 is illustrated with a bicycle control device 12 mounted on a bicycle handlebar 14 in accordance with one embodiment of the present invention. The bicycle control device 12 is a right hand side control device 12 operated by the rider's right hand. The bicycle control device 12 is preferably operatively coupled to a rear derailleur 16 via a shift control cable 18.

Preferably, the bicycle 10 includes a left hand side bicycle control device (not shown) that is substantially identical to the bicycle control device 12, except for the shifting unit has been modified to reduce the number of gears that can be shifted. Preferably, the left hand side bicycle control device is operatively coupled to a front derailleur 20 via a shift control cable 22. Alternatively, the control devices can be switched so that the rider can operate the rear derailleur 16 and the front derailleur 20 with opposite hands. In any event, the left hand side bicycle control device is essentially identical in construction and operation to the control device 12, except that it is a mirror image of the control device 12 and the number of shift positions for the left hand side bicycle control device is different. Thus, only the control device 12 will be discussed and illustrated herein. Preferably, the cables 18 and 22 are conventional bicycle cables that have an outer casing the covers an inner wire. For example, the shift control cable 18 has an inner wire 18a and an outer casing 18b.

Since most of the parts of the bicycle 10 are well known in the art, the parts of the bicycle 10 will not be discussed or illustrated in detail herein, except for the parts that relate to the present invention. In other words, only the parts related to the bicycle control device 12 will be discussed and illustrated in detail herein. Moreover, various conventional bicycle parts such as brakes, additional sprockets, derailleurs, etc., which are not illustrated and/or discussed in detail herein, can be used in conjunction with the present invention. Moreover, as used herein to describe the bicycle control device 12, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the bicycle control device 12 of the present invention.

Referring now to FIGS. 2-6, the bicycle control device 12 is illustrated in the rest position. The bicycle control device 12 basically includes a bicycle handlebar mounting portion 31, a braking unit 32 and a shifting unit 33. In this embodiment, the braking unit 32 and the shifting unit 33 are integrated into the mounting portion 31.

Figure 2:
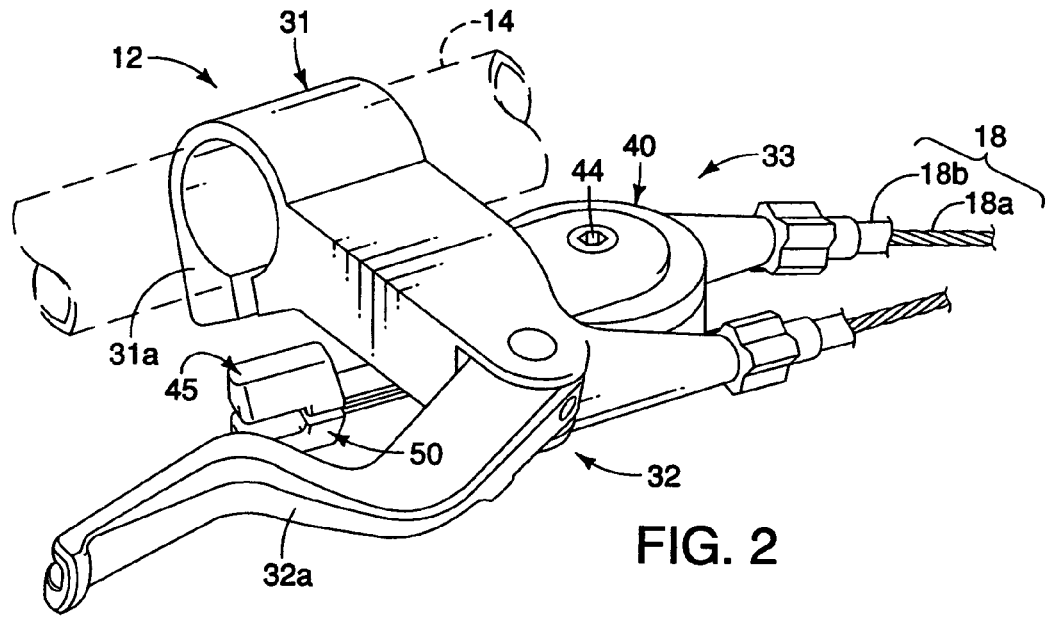
FIG. 2 is an enlarged perspective view of the bicycle control device illustrated in FIG. 1 in accordance with the first embodiment of the present invention.
Figure 3:
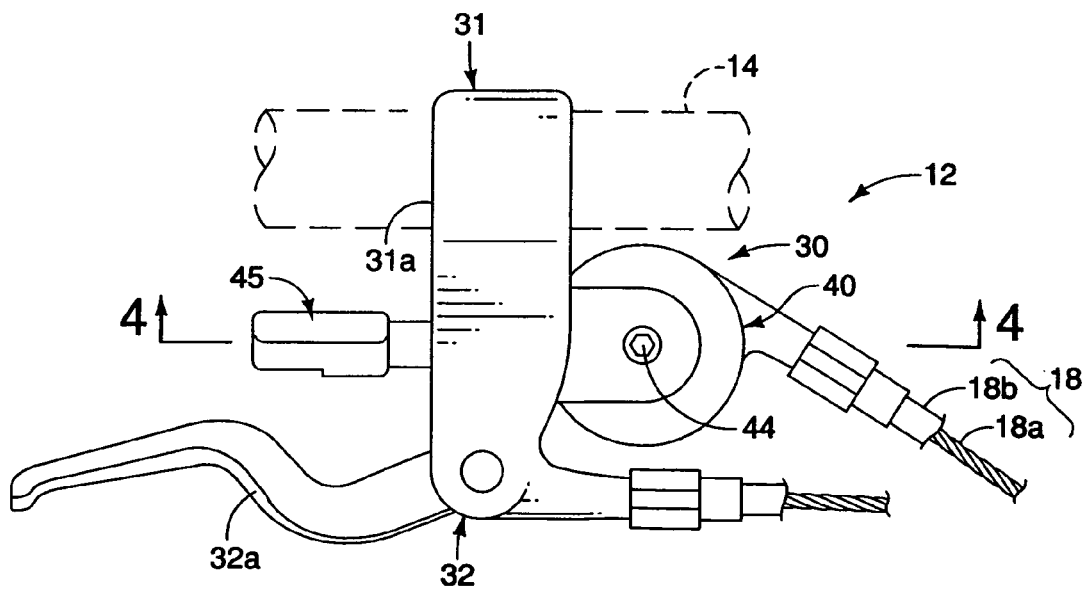
FIG. 3 is a top plan view of the bicycle control device illustrated in FIGS. 1 and 2, with the operating members (shift levers) in the rest position.
Figure 4:
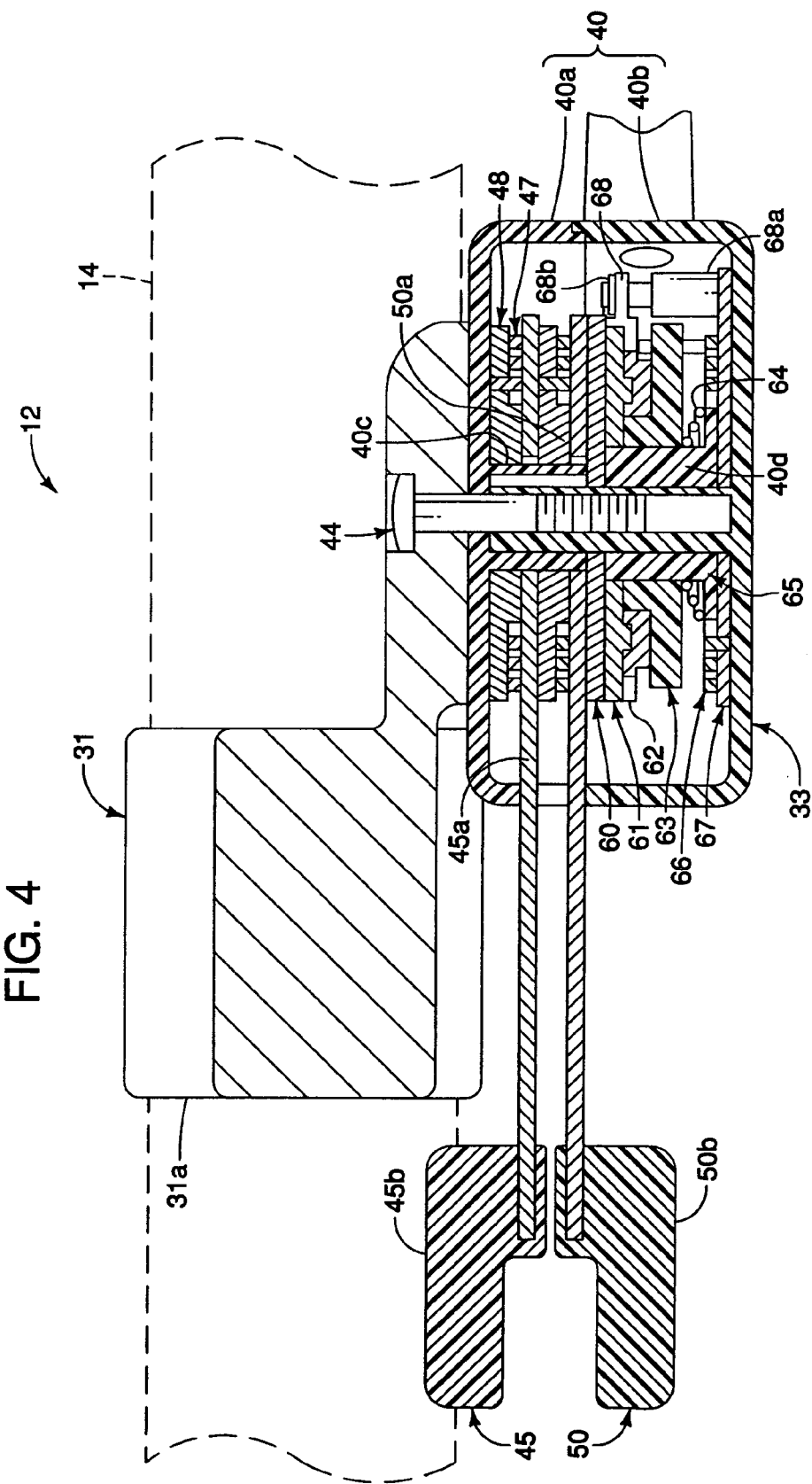
FIG. 4 is a partial cross sectional view of the bicycle control device as viewed along section line 4-4 of FIG. 3.

As best seen FIG. 2, the handlebar mounting portion 31 has a clamping section 31a that is preferably a split bore type of clamping arrangement in which the diameter of the bore is varied by a fixing bolt in a conventional manner. The clamping section 31a is relatively conventional in construction, and thus, will not be discussed or illustrated in further detail herein.

The braking unit 32 has a brake lever 32a that is pivotally mounted to the bicycle handlebar mounting portion 31 to pull and release an inner wire of a brake cable in a conventional manner. The configuration of the braking unit 32 can be any configuration, and thus, will not be discussed in further detail herein. In fact, the braking unit 32 can be eliminated from the bicycle control device 12 as needed and/or desired.

The shifting unit 33 basically includes a housing 40, a shift wire releasing assembly 41, a shift wire winding assembly 42 and a bicycle shift position control mechanism 43. The shifting unit 33 is configured and arranged such that the inner wire 18a of the shift control cable 18 can be pulled and released to selectively effect either a single-stage gear shift operation or a multiple-stage gear shift operation in a single progress shifting operation as explained below.

Figure 5:
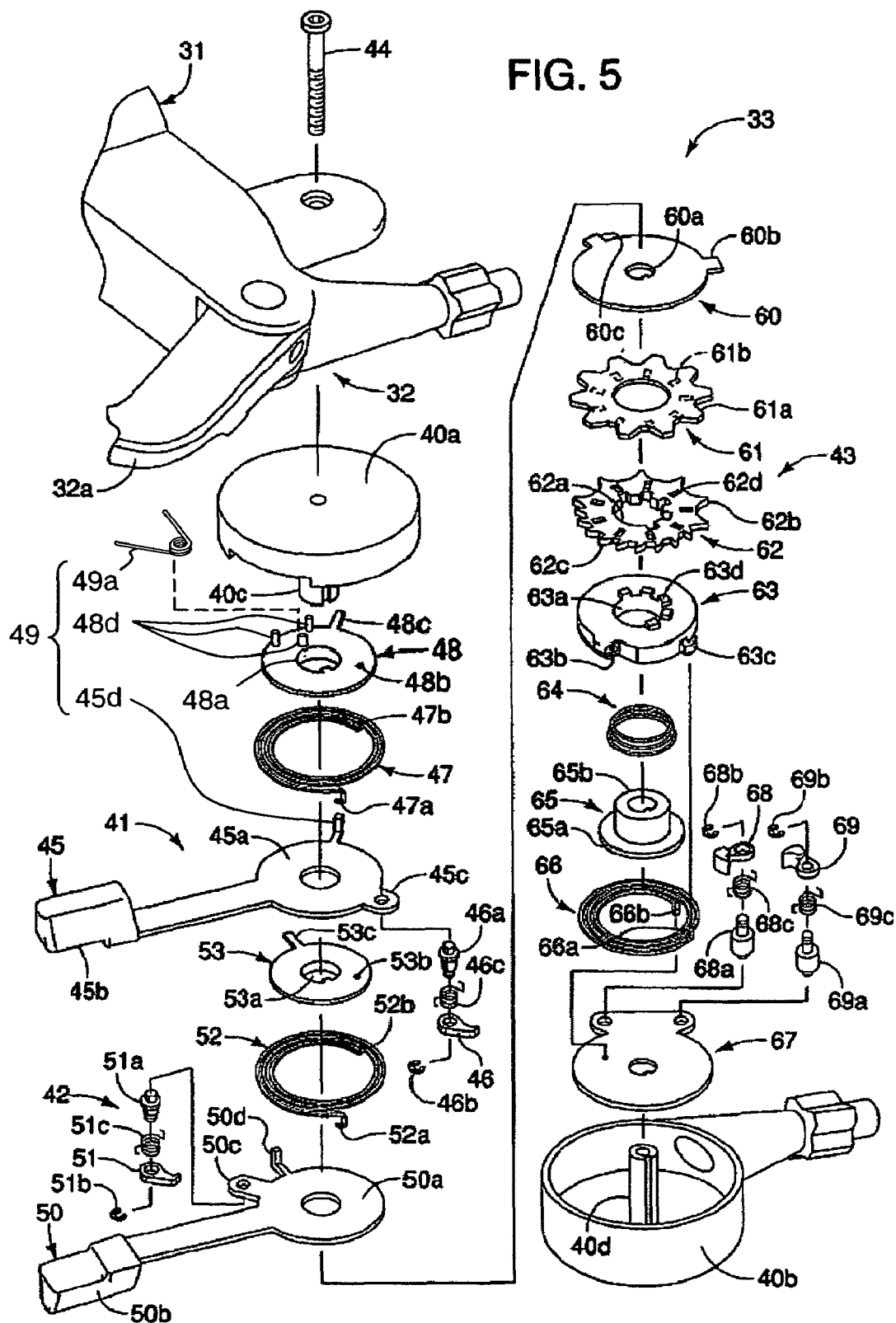
FIG. 5 is an exploded perspective view of the bicycle control device illustrated in FIGS. 1-4 in accordance with the first embodiment of the present invention.

As best seen FIG. 5, the housing 40 of the shifting unit 33 basically includes an upper casing 40a and a lower casing 40b that are coupled together by a fastener or screw 44. The upper and lower casings 40a and 40b are preferably constructed of a light weight material such a hard rigid plastic material. The housing 40 is sized and configured to form an internal cavity for receiving the shift wire releasing assembly 41, the shift wire winding assembly 42 and the bicycle shift position control mechanism 43 therein. The upper casing 40a is provided with a upper keyed shaft or post 40c, while the lower casing 40b is provided with a lower keyed shaft or post 40d. The posts 40c and 40d are designed to prevent rotational movement of selected parts of the shift unit 33 as will become apparent from the description below.

As best seen FIG. 5, the shift wire releasing assembly 41 of the shifting unit 33 basically includes a shift release lever 45 with a release pawl 46, a shift release lever return spring 47 and a shift release lever control plate 48. The shift wire releasing assembly 41 is also provided with a resistance providing structure 49 that is configured and arranged such that the user can determine when a shift has occurred during operation of the shift release lever 45. Thus, the shift wire releasing assembly 41 is configured and arranged such that the rider can easily operate the shift release lever 45 to perform a shifting operation and readily detect when a completion of a shift operation as FIGS. 22-38.

The shift release lever 45 preferably has an internal mounting portion 45a and an external rider operating portion 45b. The internal mounting portion 45a is configured and arranged to pivot around the outer periphery of the upper post 40c such that the shift release lever 45 can move between a rest position and a shift release position. The internal mounting portion 45a preferably includes a mounting tab 45c for pivotally supporting the release pawl 46 and a stop flange 45d for maintaining the shift release lever 45 in the rest position due to the biasing force of the release lever return spring 47. Thus, movement of the shift release lever 45 causes the release pawl 46 to rotate therewith about the center axis of the upper post 40c. The stop flange 45d also forms a part of the resistance providing structure 49 as discussed below.

The release pawl 46 is mounted to the mounting tab 45c via a mounting pin 46a that is riveted onto the mounting tab 45c. The release pawl 46 is held on the mounting pin 46a by a retaining clip 46b. Moreover, the release pawl 46 is biased in a counterclockwise direction by a torsion spring 46c as seen in FIG. 5. The torsion spring 46c has a first end of the torsion spring 46c engaging the release pawl 46 and a second end of the torsion spring 46c engaging the mounting tab 46c of the shift release lever 45. As explained below, the release pawl 46 is configured and arranged to selectively engage the bicycle shift position control mechanism 43 when the shift release lever 45 is pivoted from its rest position to its shift release position.

The release lever return spring 47 is preferably a torsion spring having a first end 47a engaging the shift release lever 45 and a second end 47b engaging the shift release lever control plate 48. The release lever return spring 47 biases the shift release lever 45 in a clockwise direction as seen in FIG. 5. Accordingly, the shift release lever 45 and the release lever return spring 47 cooperate together such that the shift release lever 45 as a trigger action in which the shift release lever 45 automatically springs back to its rest position after being moved to a shift release position. Preferably, the first end 47a of the release lever return spring 47 is hooked on to the mounting tab 45c to bias the shift release lever 45 in the clockwise direction.

The shift release lever control plate 48 is preferably a flat plate with a center opening 48a that is keyed such that it engages the upper post 40c to prevent rotational movement therebetween. The shift release lever control plate 48 also has a hole 48b for receiving the second end 47b of the shift lever return spring 47 therein. A stop member or flange 48c is formed on the outer periphery of the shift release lever control plate 48 to act as a stop for the shift release lever 45. In particular, the stop flange 45d of the shift release lever 45 is normally biased against the stop member 48c. The shift release lever control plate 48 is also provided with three mounting posts 48d for coupling the resistance providing structure 49 thereto.

Figure 6:
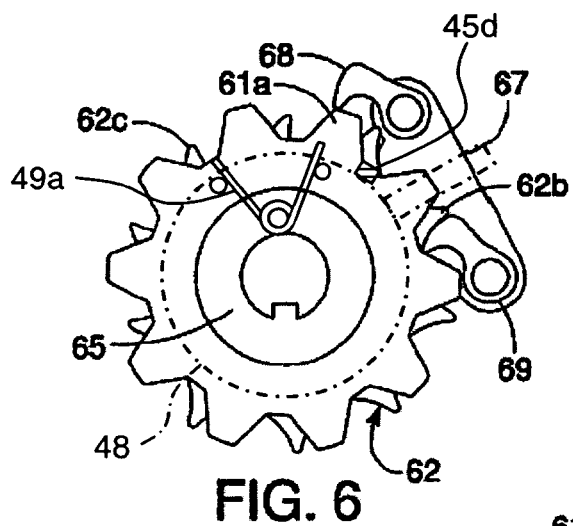
FIG. 6 is a simplified top plan view of selected parts of the shift position control mechanism for the bicycle control device illustrated in FIGS. 1-5, with the positioning plate and the releasing plate in their normal rest positions when the bicycle control device is in the first gear position, i.e., the inner wire of the rear shift cable being fully released from the wire takeup member.
Figure 7:
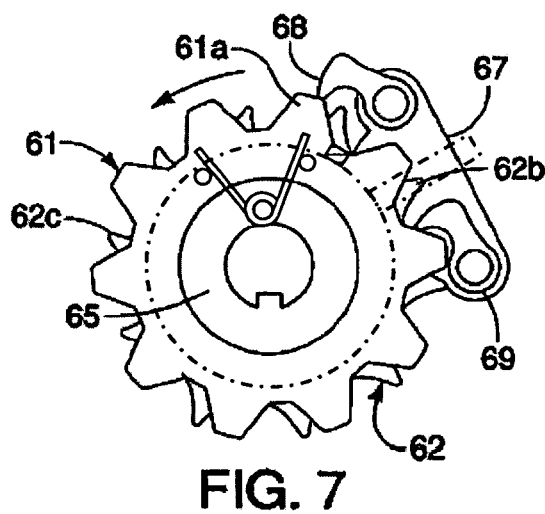
FIG. 7 is a simplified rear side elevational view of the shift position control mechanism for the bicycle control device illustrated in FIGS. 1-5, with the positioning plate and the releasing plate being rotated together by the winding lever in the shift winding direction such that the releasing plate moves the first and second position maintaining members or pawls out of engagement with the positioning plate and the releasing plate for performing a shift from the first gear position to the second gear position.
Figure 8:
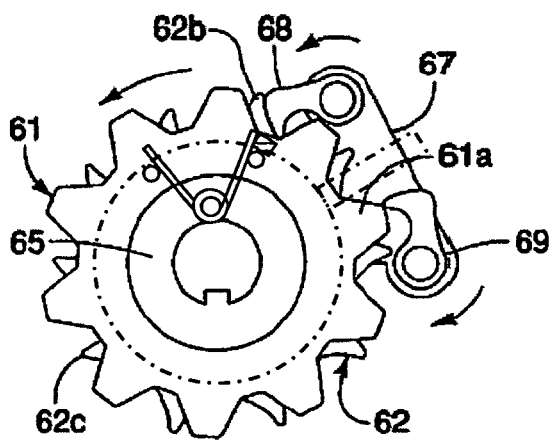
FIG. 8 is a simplified top plan view of selected parts of the shift position control mechanism for the bicycle control device illustrated in FIGS. 1-5, with the positioning plate and the releasing plate in their normal rest positions when the bicycle control device is in the second gear position.
Figure 9:
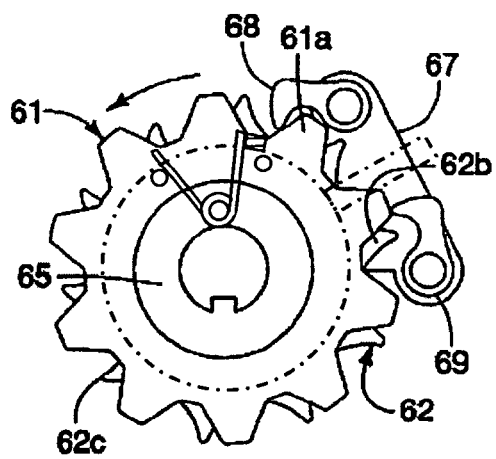
FIG. 9 is a simplified rear side elevational view of the shift position control mechanism for the bicycle control device illustrated in FIGS. 1-5, with the positioning plate and the releasing plate being rotated together by the winding lever in the shift winding direction such that the releasing plate moves the first and second position maintaining pawls out of engagement with the positioning plate and the releasing plate for performing a shift from the second gear position to the third gear position.
Figure 10:
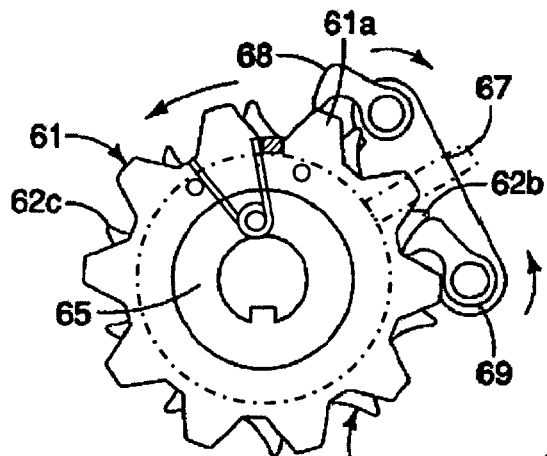
FIG. 10 is a simplified top plan view of selected parts of the shift position control mechanism for the bicycle control device illustrated in FIGS. 2-4, with the positioning plate and the releasing plate in their normal rest positions when the bicycle control device is in the third gear position.
Figure 11:
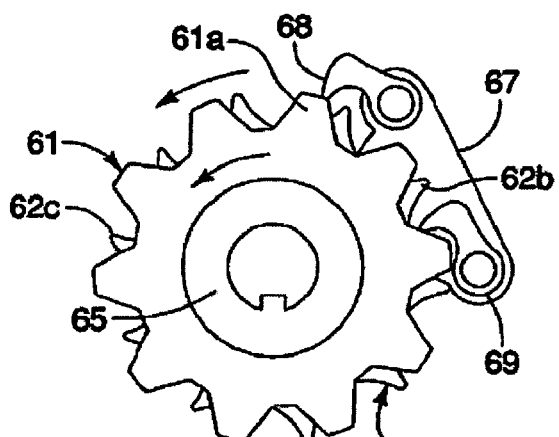
FIG. 11 is a simplified rear side elevational view of the shift position control mechanism for the bicycle control device illustrated in FIGS. 2-4, with the positioning plate and the releasing plate being rotated together by the winding lever in the shift winding direction such that the releasing plate moves the first and second position maintaining pawls out of engagement with the positioning plate and the releasing plate for performing a shift from the third gear position to the fourth gear position.
Figure 12:
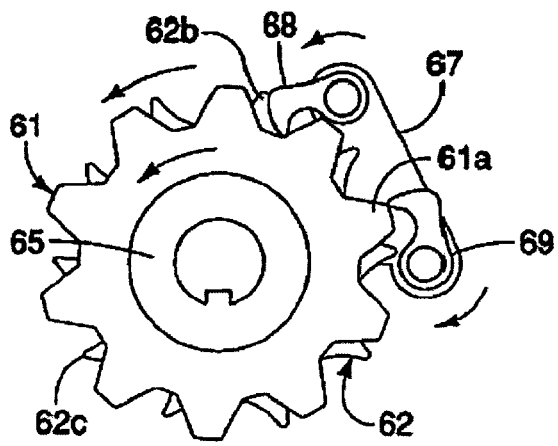
FIG. 12 is a simplified top plan view of selected parts of the shift position control mechanism for the bicycle control device illustrated in FIGS. 2-4, with the positioning plate and the releasing plate in their normal rest positions when the bicycle control device is in the fourth gear position.
Figure 13:
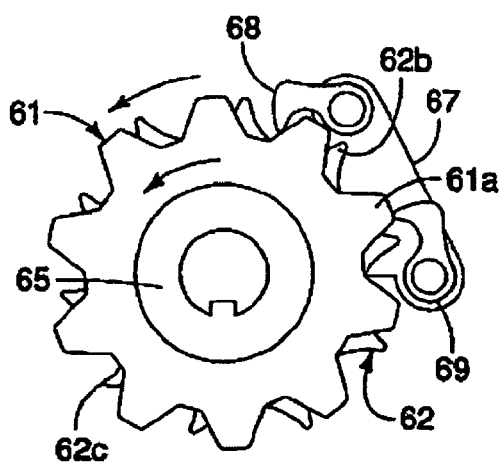
FIG. 13 is a simplified rear side elevational view of the shift position control mechanism for the bicycle control device illustrated in FIGS. 2-4, with the positioning plate and the releasing plate being rotated together by the winding lever in the shift winding direction such that the releasing plate moves the first and second position maintaining pawls out of engagement with the positioning plate and the releasing plate for performing a shift from the fourth gear position to the fifth gear position.
Figure 14:
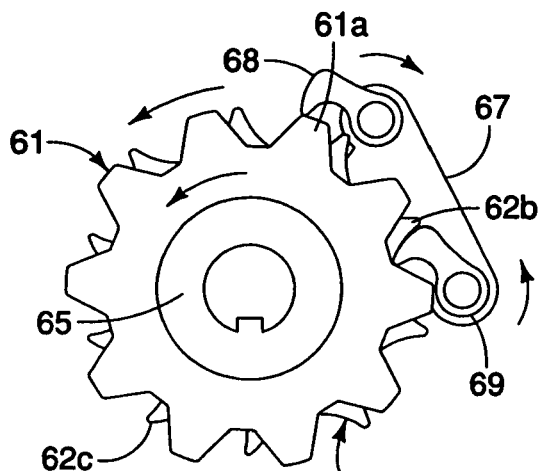
FIG. 14 is a simplified top plan view of selected parts of the shift position control mechanism for the bicycle control device illustrated in FIGS. 2-4, with the positioning plate and the releasing plate in their normal rest positions when the bicycle control device is in the fifth gear position.
Figure 15:
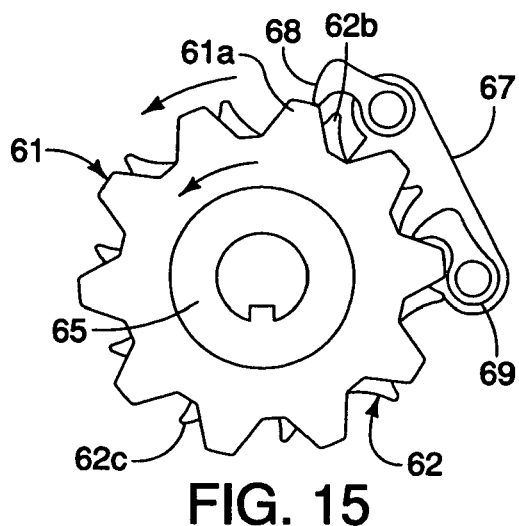
FIG. 15 is a simplified rear side elevational view of the shift position control mechanism for the bicycle control device illustrated in FIGS. 2-4, with the positioning plate and the releasing plate being rotated together by the winding lever in the shift winding direction such that the releasing plate moves the first and second position maintaining pawls out of engagement with the positioning plate and the releasing plate for performing a shift from the fifth gear position to the sixth gear position.
Figure 16:
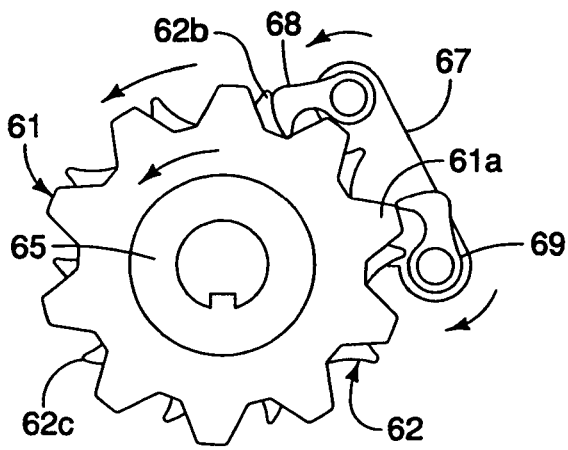
FIG. 16 is a simplified top plan view of selected parts of the shift position control mechanism for the bicycle control device illustrated in FIGS. 2-4, with the positioning plate and the releasing plate in their normal rest positions when the bicycle control device is in the sixth gear position.
Figure 17:
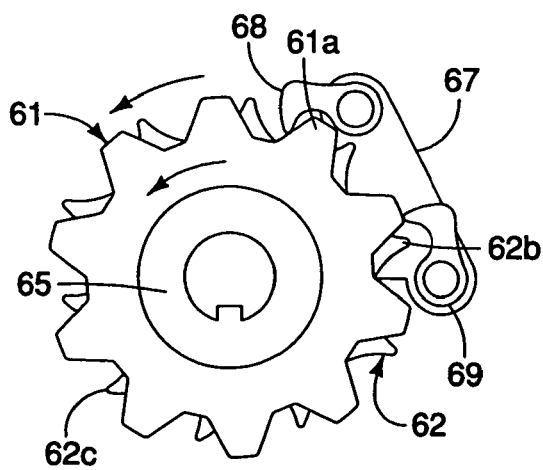
FIG. 17 is a simplified rear side elevational view of the shift position control mechanism for the bicycle control device illustrated in FIGS. 2-4, with the positioning plate and the releasing plate being rotated together by the winding lever in the shift winding direction such that the releasing plate moves the first and second position maintaining pawls out of engagement with the positioning plate and the releasing plate for performing a shift from the sixth gear position to the seventh gear position.
Figure 18:
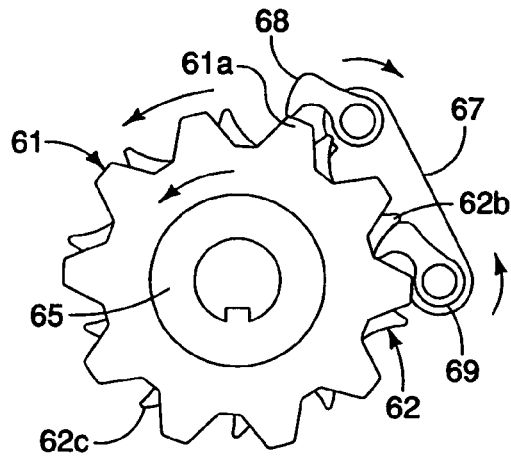
FIG. 18 is a simplified top plan view of selected parts of the shift position control mechanism for the bicycle control device illustrated in FIGS. 2-4, with the positioning plate and the releasing plate in their normal rest positions when the bicycle control device is in the seventh gear position.
Figure 19:
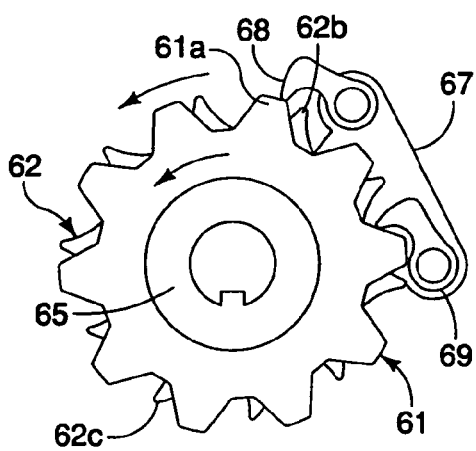
FIG. 19 is a simplified rear side elevational view of the shift position control mechanism for the bicycle control device illustrated in FIGS. 1-5, with the positioning plate and the releasing plate being rotated together by the winding lever in the shift winding direction such that the releasing plate moves the first and second position maintaining pawls out of engagement with the positioning plate and the releasing plate for performing a shift from the seventh gear position to the eighth gear position.
Figure 20:
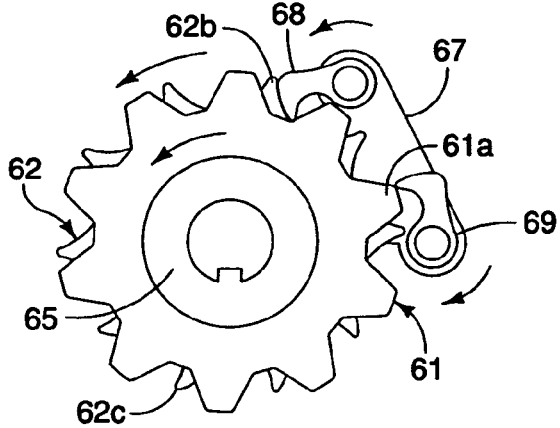
FIG. 20 is a simplified top plan view of selected parts of the shift position control mechanism for the bicycle control device illustrated in FIGS. 1-5, with the positioning plate and the releasing plate in their normal rest positions when the bicycle control device is in the eighth gear position.
Figure 21:
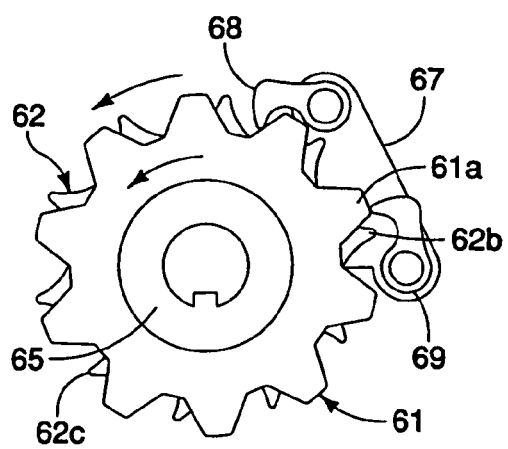
FIG. 21 is a simplified rear side elevational view of the shift position control mechanism for the bicycle control device illustrated in FIGS. 1-5, with the positioning plate and the releasing plate being rotated together by the winding lever in the shift winding direction such that the releasing plate moves the first and second position maintaining pawls out of engagement with the positioning plate and the releasing plate for performing a shift from the eighth gear position to the ninth gear position.
Figure 22:
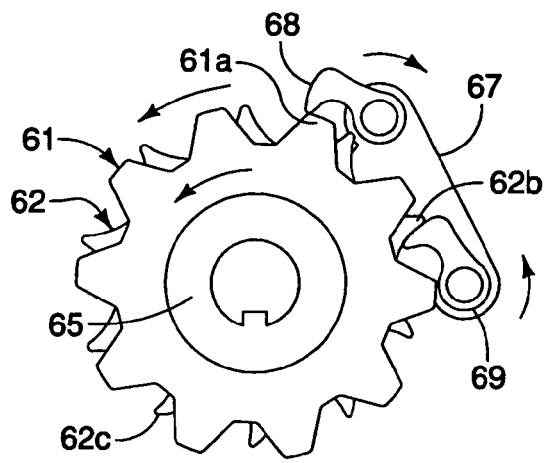
FIG. 22 is a simplified top plan view of selected parts of the shift position control mechanism for the bicycle control device illustrated in FIGS. 1-5, with the positioning plate and the releasing plate in their normal rest positions when the bicycle control device is in the ninth gear position.
Figure 23:
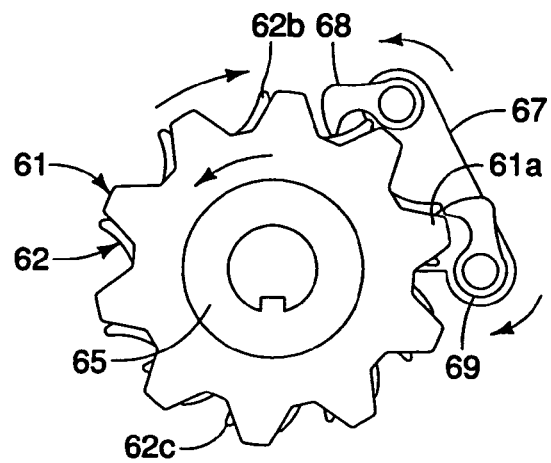
FIG. 23 is a simplified rear side elevational view of the shift position control mechanism for the bicycle control device illustrated in FIGS. 1-5, with the releasing plate being rotated by the release lever in the shift winding direction such that one of the position maintaining pawls is moved out of engagement with the positioning plate and the other position maintaining pawl moves in the path of the positioning plate for starting a shift from the ninth gear position to the eighth gear position.
Figure 24:
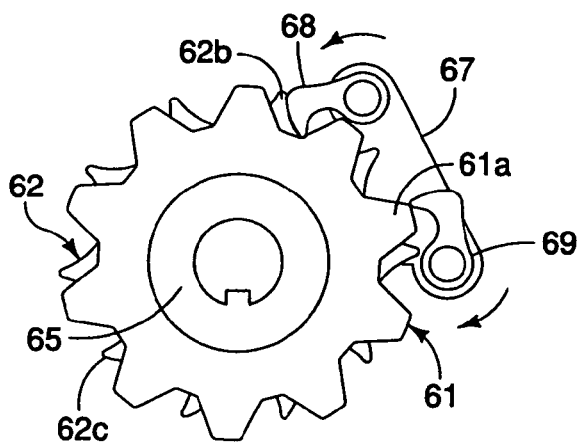
FIG. 24 is a simplified rear side elevational view of the shift position control mechanism for the bicycle control device illustrated in FIGS. 1-5, with the positioning plate being rotated by the release spring in the shift releasing direction after the releasing plate has been rotated by the release lever in the shift winding direction such that the shift operation from the ninth gear position to the eighth gear position is completed.
Figure 25:
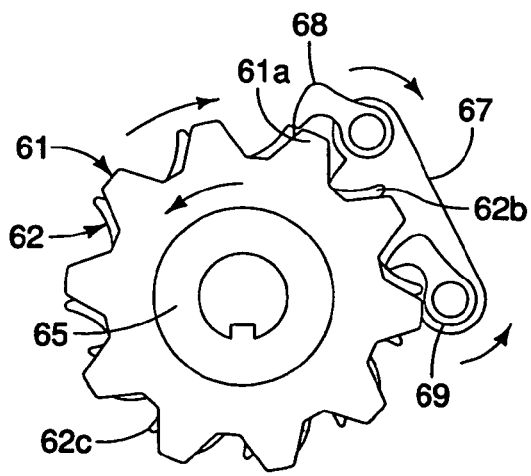
FIG. 25 is a simplified rear side elevational view of the shift position control mechanism for the bicycle control device illustrated in FIGS. 1-5, with the releasing plate being rotated by the release lever in the shift winding direction such that one of the position maintaining pawls is moved out of engagement with the positioning plate and the other position maintaining pawl moves in the path of the positioning plate for starting a shift from the eighth gear position to the seventh gear position.
Figure 26:
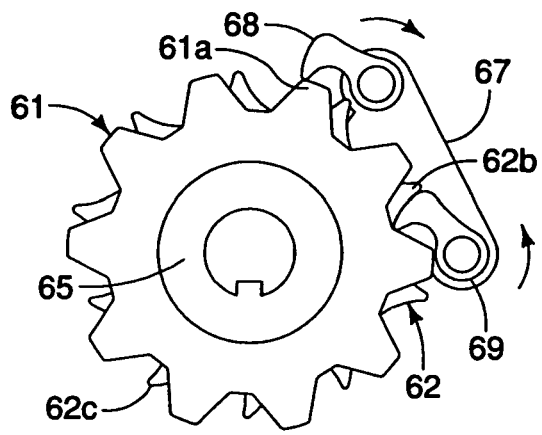
FIG. 26 is a simplified rear side elevational view of the shift position control mechanism for the bicycle control device illustrated in FIGS. 1-5, with the positioning plate being rotated by the release spring in the shift releasing direction after the releasing plate has been rotated by the release lever in the shift winding direction such that the shift operation from the eighth gear position to the seventh gear position is completed.
Figure 27:
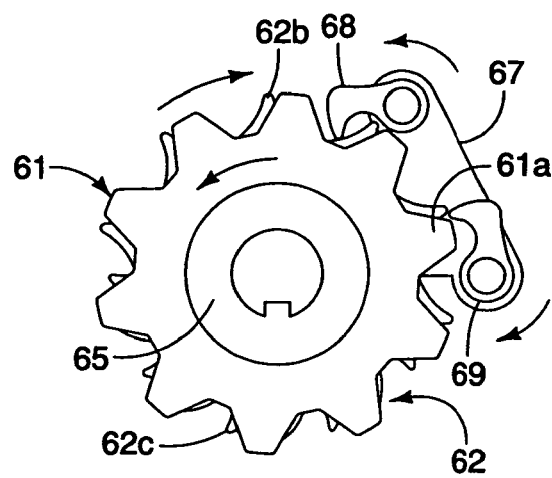
FIG. 27 is a simplified rear side elevational view of the shift position control mechanism for the bicycle control device illustrated in FIGS. 1-5, with the releasing plate being rotated by the release lever in the shift winding direction such that one of the position maintaining pawls is moved out of engagement with the positioning plate and the other position maintaining pawl moves in the path of the positioning plate for starting a shift from the seventh gear position to the sixth gear position.
Figure 28:
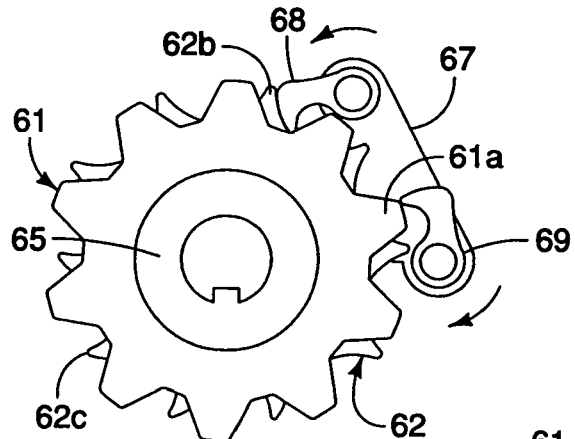
FIG. 28 is a simplified rear side elevational view of the shift position control mechanism for the bicycle control device illustrated in FIGS. 1-5, with the positioning plate being rotated by the release spring in the shift releasing direction after the releasing plate has been rotated by the release lever in the shift winding direction such that the shift operation from the seventh gear position to the sixth gear position is completed.
Figure 29:
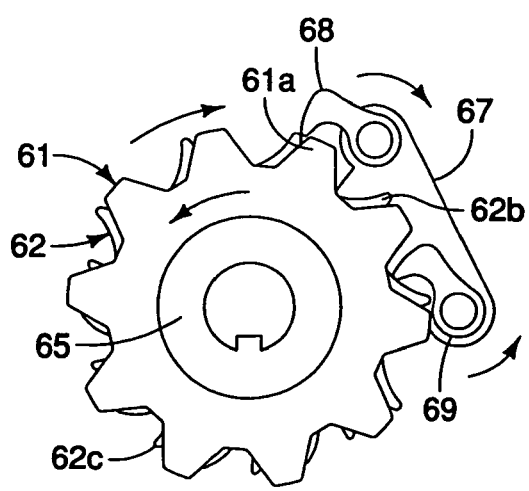
FIG. 29 is a simplified rear side elevational view of the shift position control mechanism for the bicycle control device illustrated in FIGS. 1-5, with the releasing plate being rotated by the release lever in the shift winding direction such that one of the position maintaining pawls is moved out of engagement with the positioning plate and the other position maintaining pawl moves in the path of the positioning plate for starting a shift from the sixth gear position to the fifth gear position.
Figure 30:
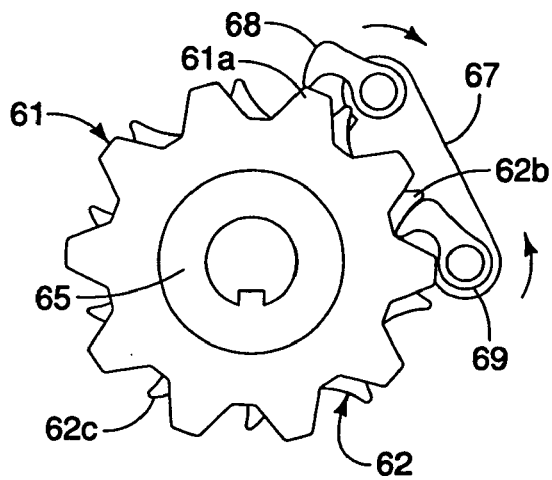
FIG. 30 is a simplified rear side elevational view of the shift position control mechanism for the bicycle control device illustrated in FIGS. 1-5, with the positioning plate being rotated by the release spring in the shift releasing direction after the releasing plate has been rotated by the release lever in the shift winding direction such that the shift operation from the sixth gear position to the fifth gear position is completed.
Figure 31:
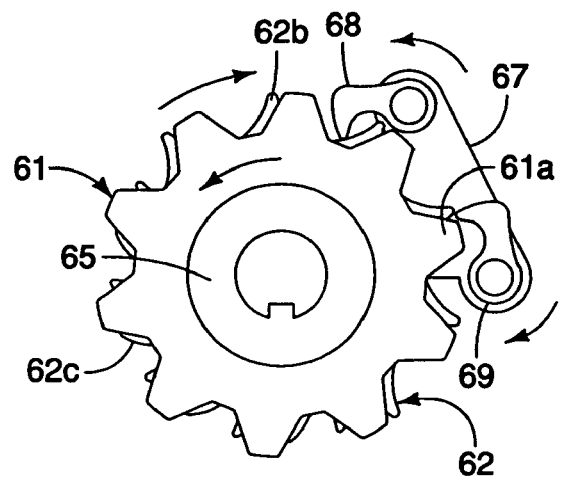
FIG. 31 is a simplified rear side elevational view of the shift position control mechanism for the bicycle control device illustrated in FIGS. 1-5, with the releasing plate being rotated by the release lever in the shift winding direction such that one of the position maintaining pawls is moved out of engagement with the positioning plate and the other position maintaining pawl moves in the path of the positioning plate for starting a shift from the fifth gear position to the fourth gear position.
Figure 32:
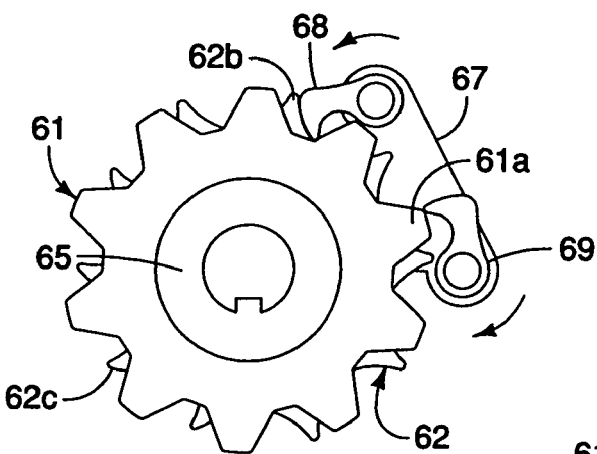
FIG. 32 is a simplified rear side elevational view of the shift position control mechanism for the bicycle control device illustrated in FIGS. 1-5, with the positioning plate being rotated by the release spring in the shift releasing direction after the releasing plate has been rotated by the release lever in the shift winding direction such that the shift operation from the fifth gear position to the fourth gear position is completed.
Figure 33:
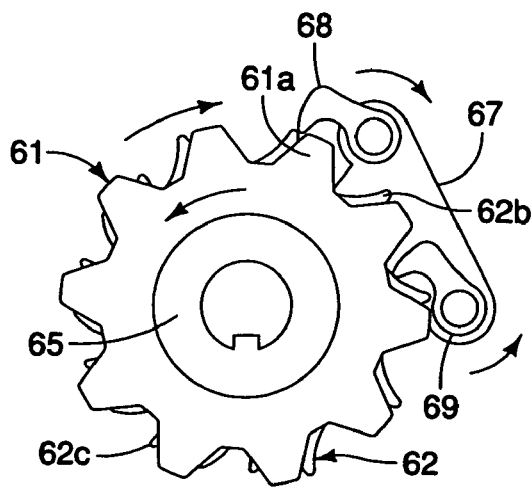
FIG. 33 is a simplified rear side elevational view of the shift position control mechanism for the bicycle control device illustrated in FIGS. 1-5, with the releasing plate being rotated by the release lever in the shift winding direction such that one of the position maintaining pawls is moved out of engagement with the positioning plate and the other position maintaining pawl moves in the path of the positioning plate for starting a shift from the fourth gear position to the third gear position.
Figure 34:
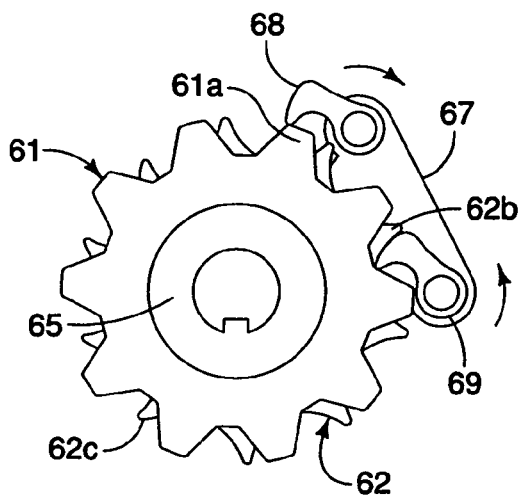
FIG. 34 is a simplified rear side elevational view of the shift position control mechanism for the bicycle control device illustrated in FIGS. 1-5, with the positioning plate being rotated by the release spring in the shift releasing direction after the releasing plate has been rotated by the release lever in the shift winding direction such that the shift operation from the fourth gear position to the third gear position is completed.
Figure 35:
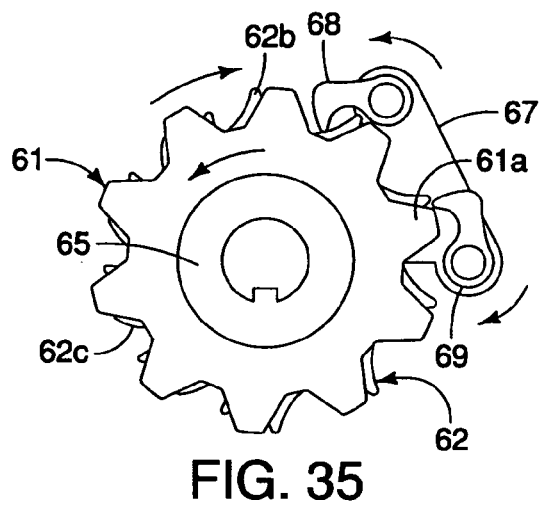
FIG. 35 is a simplified rear side elevational view of the shift position control mechanism for the bicycle control device illustrated in FIGS. 1-5, with the releasing plate being rotated by the release lever in the shift winding direction such that one of the position maintaining pawls is moved out of engagement with the positioning plate and the other position maintaining pawl moves in the path of the positioning plate for starting a shift from the third gear position to the second gear position.
Figure 36:
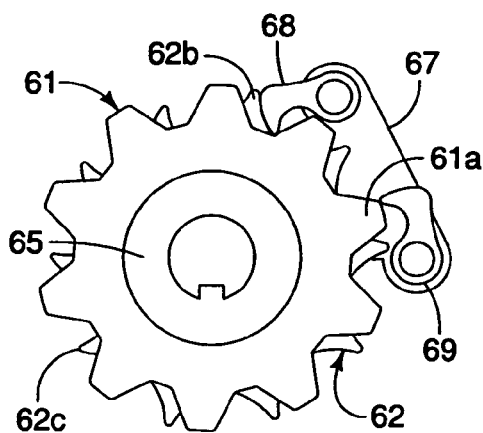
FIG. 36 is a simplified rear side elevational view of the shift position control mechanism for the bicycle control device illustrated in FIGS. 1-5, with the positioning plate being rotated by the release spring in the shift releasing direction after the releasing plate has been rotated by the release lever in the shift winding direction such that the shift operation from the third gear position to the second gear position is completed.
Figure 37:
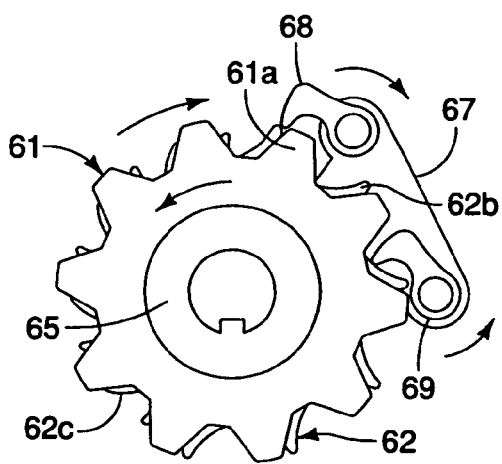
FIG. 37 is a simplified rear side elevational view of the shift position control mechanism for the bicycle control device illustrated in FIGS. 1-5, with the releasing plate being rotated by the release lever in the shift winding direction such that one of the position maintaining pawls is moved out of engagement with the positioning plate and the other position maintaining pawl moves in the path of the positioning plate for starting a shift from the second gear position to the first gear position.
Figure 38:
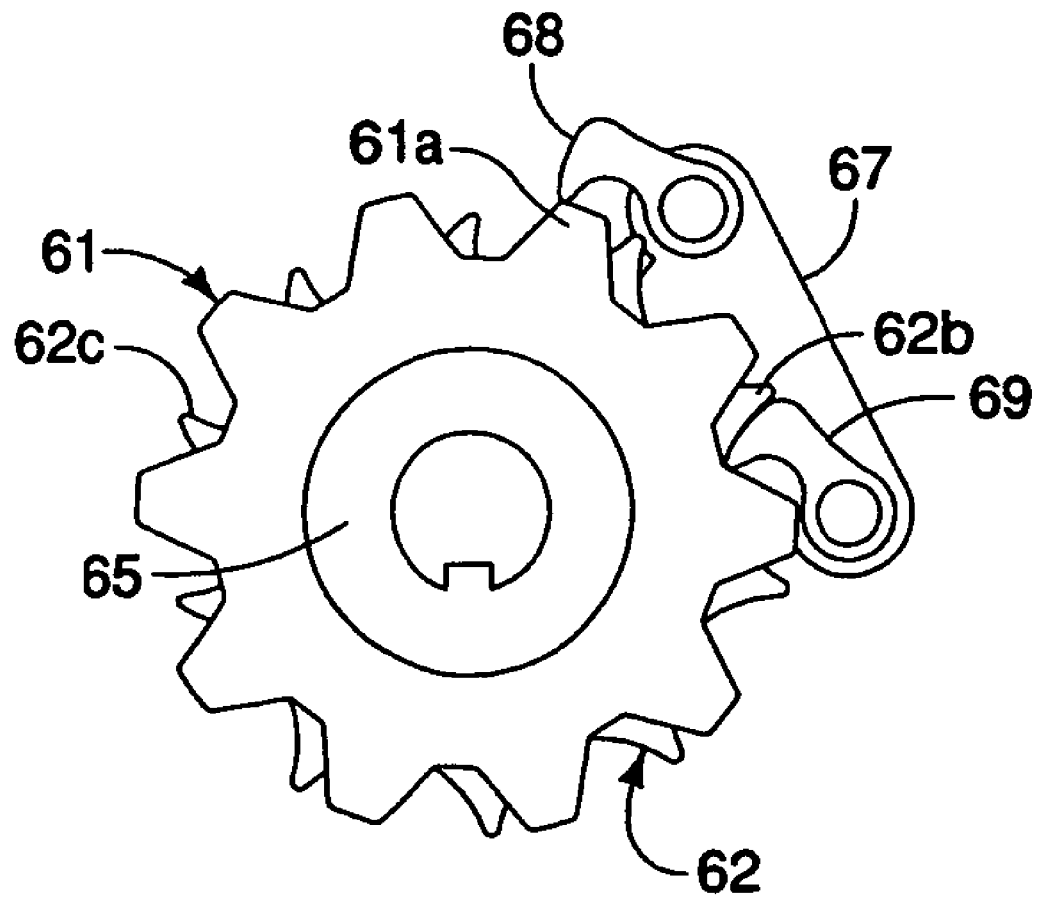
FIG. 38 is a simplified rear side elevational view of the shift position control mechanism for the bicycle control device illustrated in FIGS. 1-5, with the positioning plate being rotated by the release spring in the shift releasing direction after the releasing plate has been rotated by the release lever in the shift winding direction such that the shift operation from the second gear position to the first gear position is completed.
Figure 39:
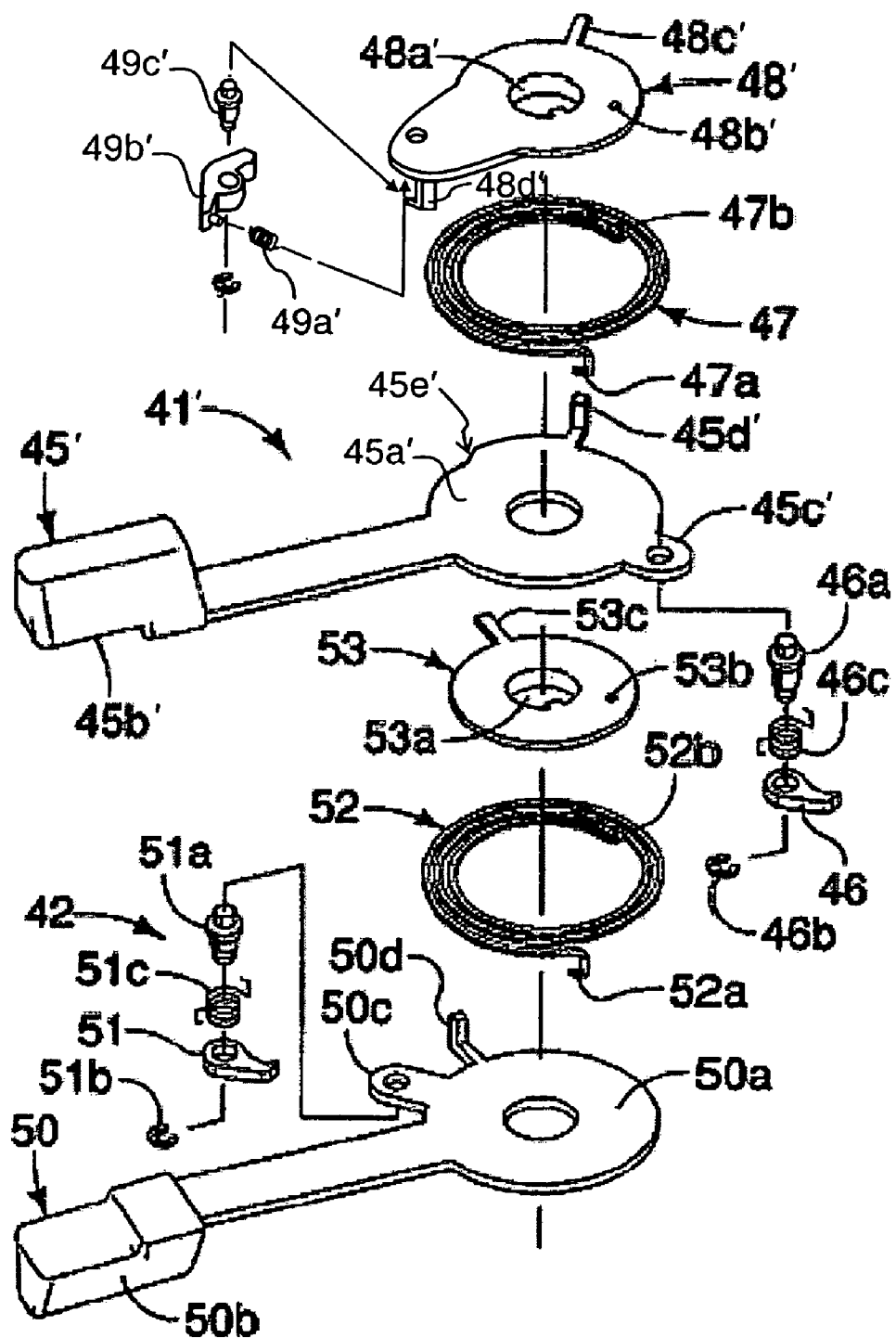
FIG. 39 is an exploded perspective view of a selected parts of modified bicycle control device in accordance with a second embodiment of the present invention.

The resistance providing structure 49 of the shift wire releasing assembly 41 includes a biasing element or torsion spring 49a that is installed on the mounting posts 48d of the shift release lever control plate 48. When the shift wire releasing assembly 41 is assembled, the spring 49a is normally in its rest position as seen in FIG. 6. When the shift release lever 45 is moved from the rest position to a shift release position, the spring 49a remains in its rest position (i.e., not being further compressed) until a first shift operation has been completed as seen in FIGS. 6-8. However, after a first shift operation has been completed, the spring 49a is compressed by the stop flange 45d which forms a part of the resistance providing structure 49. Thus, the change in resistance on the shift release lever 45 due to the compression of the spring 49a by the stop flange 45d is felt by the rider to indicate that a first shift operation has been completed and the start of a second shift operation.

Accordingly, in this embodiment, the stop flange 45d forms a first contact portion of the resistance providing structure 49 while one of the legs of the spring 49a forms a second contact portion, with contact occurring between the first and second contact portions when the shift release lever 45 (operating member) moves from the rest (first) position toward the shift (second) position such that increased resistance occurs in operating the shift release lever 45 (operating member). In other words, the resistance providing structure 49 is configured and arranged to provide separate resistance from bicycle shift position control mechanism 43 so that the riders knows when a first shift operation has been completed.

Specifically, the first contact portion formed by the stop flange 45d is an abutment that is moved with the movement of the shift release lever 45. The second contact portion formed by one of the legs of the spring 49a is operatively engaged by the first contact portion or abutment formed by the stop flange 45d at an intermediate position between the rest (first) position and the shift (second) position in which two shifting operations have occurred during movement of the shift release lever 45 from the first position toward the second position. Stated differently, the shift release lever 45 (operating member) and the resistance providing structure 49 are configured and arranged to form a transition point between a first range of movement of the shift release lever 45 and a subsequent second range of movement of the shift release lever 45, with the transition point corresponding to a completed first shift operation.

As mentioned above, the change in resistance on the shift release lever 45 due to the compression of the spring 49a by the stop flange 45d is felt by the rider to indicate that a first shift operation has been completed and the start of a second shift operation. Thus, the rider can release the shift release lever 45 (operating member) before performing the second shift operation, if desired, or the rider can release the shift release lever 45 (operating member) after performing two consecutive shift operations in a single progressive movement of the shift release lever 45. At the transition point, a sudden change in resistance occurs in the shift release lever 45.

As best seen FIG. 5, the shift wire winding assembly 42 of the shifting unit 33 basically includes a shift winding lever 50 with a winding pawl 51, a shift winding lever return spring 52 and a shift winding lever control plate 53. The shift wire winding assembly 42 is configured and arranged such that the rider can easily operate the shift winding lever 50 to perform a shift winding operation as FIGS. 6-22.

The shift winding lever 50 basically includes an internal mounting portion 50a and an external rider operating portion 50b. The internal mounting portion 50a is configured and arranged to pivot around the outer periphery of the upper post 40c such that the shift winding lever 50 can move between a rest position and a shift winding position. The internal mounting portion 50a preferably includes a mounting tab 50c for pivotally supporting the winding pawl 51 and a stop flange 50d for maintaining the shift winding lever 50 in the rest position due to the biasing force of the winding lever return spring 52. Thus, movement of the shift winding lever 50 causes the winding pawl 51 to rotate therewith about the center axis of the upper post 40c.

The winding pawl 51 is mounted to the mounting tab 50c via a mounting pin 51a that is riveted onto the mounting tab 50c. The winding pawl 51 is held on the mounting pin 51a by a retaining clip 51b. Moreover, the winding pawl 51 is biased in a counterclockwise direction by a torsion spring 51c as seen in FIG. 5. The torsion spring 51c has a first end of the torsion spring 51c engaging the winding pawl 51 and a second end of the torsion spring 51c engaging the mounting tab 50c of the shift winding lever 50. As explained below, the winding pawl 51 is configured and arranged to selectively engage the bicycle shift position control mechanism 43 when the shift winding lever 50 is pivoted from its rest position to its shift release position.

The winding lever return spring 52 is preferably a torsion spring having a first end 52a engaging the shift winding lever 50 and a second end 52b engaging the shift winding lever control plate 53. The winding lever return spring 52 biases the shift winding lever 50 in a clockwise direction as seen in FIG. 5. Accordingly, the shift winding lever 50 and the winding lever return spring 52 cooperate together such that the shift winding lever 50 as a trigger action in which the shift winding lever 50 automatically springs back to its rest position after being moved to a shift release position. Preferably, the first end 52a of the winding lever return spring 52 is hooked on to the mounting tab 50c to bias the shift winding lever 50 in the clockwise direction.

The shift winding lever control plate 53 is preferably a flat plate with a center opening 53a that is keyed such that it engages the upper post 40c to prevent rotational movement therebetween. The shift winding lever control plate 53 also has a hole 53b for receiving the second end 52b of the winding lever return spring 52 therein. A stop member or flange 53c is formed on the outer periphery of the shift winding lever control plate 53 to act as a stop for the shift winding lever 50. In particular, the stop flange 50d of the shift winding lever 50 is normally biased against the stop member 53c.

As best seen FIG. 5, the bicycle shift position control mechanism 43 of the shifting unit 33 basically includes a pawl cam plate 60, a releasing member or plate 61, a positioning member or plate 62, a wire take up member 63, a compression spring 64, a spacer 65, a wire take up release spring or biasing member 66, a mounting plate 67, a first position maintaining member or pawl 68 and a second position maintaining member or pawl 69. In the present invention, the resistance providing structure 49 is configured and arranged to provide separate resistance from the resistance of the positioning member or plate 62 and the maintaining members or pawls 68 and 69 of the bicycle shift position control mechanism 43.

The pawl cam plate 60 is a flat rigid metal plate that is fixed to the housing 40 so that it does not rotate or move. In particular, the pawl cam plate 60 has a center opening 60a that is keyed so as to mate with the post 40c of the upper casing 40a. Of course, other non-circular cross sections can be utilized to prevent relative rotation between the pawl cam plate 60 and the housing 40. The pawl cam plate 60 preferably includes a release pawl holding projection 60b and a winding pawl holding projection 60c. The pawl holding projections 60b and 60c are preferably formed peripheral edge of the pawl cam plate 60. The release pawl holding projection 60b is configured and arranged to hold the release pawl 46 in a disengaged or rest position against the biasing force of the spring 46c. Similarly, the winding pawl holding projection 60c is configured and arranged to hold the winding pawl 51 in a disengaged or rest position against the biasing force of the spring 51c.

The releasing member or plate 61 is preferably a flat metal plate that is mounted on the post 40d to rotate around the peripheral surface of the post 40d. The releasing plate 61 is configured and arranged to selectively move the first position maintaining pawl 68 between a first engagement position and a first disengagement position, and to selectively move the second position maintaining pawl 69 between a second engagement position and a second disengagement position as will become apparent from the following discussion. Moreover, the releasing plate 61 is configured and arranged to selectively release the positioning plate 62 from the first and second position maintaining pawls 68 and 69 to cause the positioning plate 62 to rotate one shift position of the predetermined shift positions when the releasing plate 61 is moved a first predetermined amount by the shift release lever 45, and to cause the positioning member to rotate two consecutive shift positions of the predetermined shift positions when the releasing plate 61 is moved a second predetermined amount in a single progressive shift operation of the shift release lever 45.

The release plate 61 is rotated in a counterclockwise direction by the shift release lever 45. Preferably, the shift release lever 45 and the releasing plate 61 are configured and arranged such that multiple shifting operations are possible with a single progressive movement of the shift release lever 45. The releasing plate 61 includes a plurality of camming teeth 61a which are selectively engaged by the release pawl 46 for rotating the releasing plate 61. The release plate 61 also includes a plurality of ramp shaped detents 61b that are circumferentially spaced apart on its lower surfaces to form part of a one way clutch that cooperates with the positioning member 62 so that the releasing plate 61 can rotate in a counterclockwise direction relative to the positioning plate 62.

The positioning member or plate 62 is preferably a flat metal plate that is freely rotatable about the post 40c. The positioning plate 62 is fixed to the wire take up member 63 such that they rotate together in response to movement of either the shift release lever 45 or the shift winding lever 50. More specifically, the positioning plate 62 is biased in a clockwise direction by the wire take up release spring 66, but normally held in one of the nine shift positions by either the first position maintaining pawl 68 or the second position maintaining pawl 69.

The positioning plate 62 preferably includes a non-circular opening 62a that is configured and arranged to mate with the wire take up member 63 to prevent relative rotation therebetween. Preferably, the peripheral surface of the positioning plate 62 is provided with six shift positioning teeth 62b and ten shift winding teeth 62c. The shift positioning teeth 62b are configured and arranged to selectively engage the first and second position maintaining pawls 68 and 69 such that the wire take up member 63 can be selectively held in one of the nine different shift positions. The shift winding teeth 62c are configured and arranged to be selectively engaged by the tooth of the winding pawls 51 of the shift winding lever 50.

The positioning plate 62 also includes a plurality of ramp shaped recesses 62d which engage the ramp shaped detents 61b to allow rotational movement in only one direction. In particular, the ramp shaped detents 61b and the ramp shaped recesses 62d cooperate together with the compression spring 64 to form a one way clutch. Thus, the releasing plate 61 rotates independently in a counterclockwise direction relative to the positioning plate 62 when the releasing plate 61 is rotated, but the releasing plate 61 and the positioning plate 62 move together in the counterclockwise direction when the positioning plate 62 is rotated. In other words, the releasing plate 61 is fixed to the positioning plate 62 by the ramp shaped detents 61b and the ramp shaped recesses 62d when the positioning member 62 is rotated in the counterclockwise direction by the winding pawl 51 engaging one of the shift winding teeth 62c. However, the releasing plate 61 rotates relative to the positioning plate 62 when the releasing plate 61 is rotated in a counterclockwise direction and the positioning plate 62 is rotated in the clockwise direction by the wire take up release spring 66.

In particular, when the shift winding lever 50 is in the rest position, the winding pawl 51 has its tooth resting on the winding pawl holding projection 60c of the pawl cam plate 60. However, when the shift winding lever 60 is rotated from its rest position to a shift position, then the winding pawl 51 moves off of the winding pawl holding projection 60c and moves into engagement with the shift winding teeth 62c so as to rotate the positioning plate 62. Since the positioning plate 62 is connected to the wire take up member 63, the positioning plate 62 and the wire take up member 63 move together. Also, due to the one way clutch form between the releasing plate 61 and the positioning plate 62, the releasing plate 61 and the positioning plate 62 also rotate together in response to movement of the shift winding lever 50.

The wire take up member 63 is a conventional type wire take up spool in which the inner wire 18a is round along the peripheral edge surface of the wire take up member 63 as the wire take up member 63 is rotated in a counterclockwise direction. Thus, the wire take up member 63 has a center opening 63a that is rotatably mounted on the post 40c. The peripheral edge of the wire take up member 63 has a wire attachment opening 63b for attaching the inner wire 18a of the shift cable 18 thereto. Also, the peripheral edge of the wire take up member 63 has a hook member 63c for attaching the wire take up release spring 66 thereto. Thus, the wire take up release spring 66 biases the wire take up member 63 in a clockwise direction, i.e., a shift release direction. The upper surface of the wire take up member 63 has a plurality of projections 63d which engage a plurality of recesses formed in the opening 62a of the positioning plate 62. Thus, the positioning plate 62a and the wire take up member 63 are coupled together so as that they rotate together as a unit when the shifting unit 33 is in the assembled state.

The wire take up release spring 66 is preferably a torsion spring having a first end 66a attached to the hook 63c of the wire take up member 63, and a second end 64b coupled to the mounting plate 67. The wire take up release spring 66 applies a biasing force to urge the wire take up member 63 in the clockwise direction.

The spacer 65 is a hat shaped member having a flat base plate 65a and a tubular member 65b. The base member 65a is configured and arranged so as to prevent the wire take up release spring 66 from being compressed when the shift unit 33 is assembled. The tubular portion 65b is non-rotatably secured to the lower post 40d and maintains proper spacing between the wire take up member 63 and the compression spring 64.

The first position maintaining pawl 68 is fixedly coupled to the mounting plate via a pin 68a which is riveted onto the mounting plate 67. The first position maintaining pawl 68 is held on the mounting pin 68a by a retaining clip 68b. Moreover, the first position maintaining pawl 68 is biased in a counterclockwise direction by a torsion spring 68c as seen in FIG. 5. The torsion spring 68c has a first end of the torsion spring 68c engaging the first position maintaining pawl 68 and a second end of the torsion spring 68c engaging the mounting plate 67. Thus, the first position maintaining pawl 68 configured and arranged to selectively move between a first engagement position that holds the positioning plate 62 in one of the predetermined shift positions and a first disengagement position that releases the positioning plate 62 for rotational movement.

The second position maintaining pawl 69 is fixedly coupled to the mounting plate via a pin 69a which is riveted onto the mounting plate 67. The second position maintaining pawl 69 is held on the mounting pin 69a by a retaining clip 69b. Moreover, the second position maintaining pawl 69 is biased in a counterclockwise direction by a torsion spring 69c as seen in FIG. 5. The torsion spring 69c has a first end of the torsion spring 69c engaging the second position maintaining pawl 69 and a second end of the torsion spring 69c engaging the mounting plate 67. Thus, the second position maintaining pawl 69 configured and arranged to selectively move between a second engagement position that holds the positioning plate 62 in one of the predetermined shift positions and a second disengagement position that releases the positioning plate 62 for rotational movement.

The first and second position maintaining pawls 68 and 69 are configured and arranged to alternately engage adjacent teeth of the positioning plate 62 as the first and second position maintaining pawls 68 and 69 are moved by the rotation of the release plate to perform a shifting operation between sequential shift positions of the predetermined shift positions.

As seen in FIGS. 6 to 22, a shifting operation from the first gear position to the ninth gear position is illustrated in which the positioning plate 62 and the releasing plate 61 are rotated together by the rider pushing the shift winding lever 50. In particular, the rotation of the releasing plate 61 and the positioning plate 62 causes the first and second position maintaining pawls 68 and 69 to be moved and/or held out of engagement with the positioning teeth 62b of the positioning plate 62 by one of the camming teeth 61a of the releasing plate 61 against the urging force of the springs 68c and 69c. Once the releasing plate 61 and the positioning plate 62 have been moved a predetermined amount, one of the first and second position maintaining pawls 68 and 69 will be forced back into the path of the positioning teeth 62b of the positioning plate 62 by the urging force of its springs 68c or 69c, while the other of the first and second position maintaining pawls 68 and 69 will be held out of engagement from the positioning teeth 62b of the positioning plate 62 by one of the camming teeth 61a of the releasing plate 61. This upshifting can be performed in a single progressively movement of the shift winding lever 50 without stopping or returning to the shift winding lever 50 to the rest position such that multiple gears shifts occur in the single shift operation.

As seen in FIGS. 6 to 10, the stop flange 45d of the shift release lever 45 (operating member) and the spring 49a are configured and arranged to form a transition point between a first range of movement of the shift release lever 45 (FIGS. 6 to 8) and a subsequent second range of movement of the shift release lever 45 (FIGS. 8 to 9), with the transition point (FIG. 8) corresponding to a completed shift operation occurring from one of the predetermined shift positions to a next adjacent one of the predetermined shift position.

Referring to FIGS. 22 to 38, a shifting operation from the ninth gear position to the first gear position is illustrated in which the releasing plate 61 is rotated together by the rider pushing the shift release lever 45. In particular, the rotation of the releasing plate 61 causes the first and second position maintaining pawls 68 and 69 to be moved and/or held out of engagement with the positioning teeth 62b of the positioning plate 62 by one of the camming teeth 61a of the releasing plate 61 against the urging force of the springs 68c and 69c. Once the releasing plate 61 has been moved a predetermined amount, one of the first and second position maintaining pawls 68 and 69 will be forced back into the path of the positioning teeth 62b of the positioning plate 62 by the urging force of the springs 68c and 69c, while the other of the first and second position maintaining pawls 68 and 69 will be held out of engagement from the positioning teeth 62b of the positioning plate 62 by one of the camming teeth 61a of the releasing plate 61. This shifting can be performed in a single progressively movement of the shift release lever 45 without stopping or returning to the shift release lever 45 to the rest position such that multiple gears shifts occur in the single shift operation.

Second Embodiment

Referring now to FIGS. 39-42, a modified shift wire releasing assembly 41' in accordance with the second embodiment of the present invention is illustrated for use in the shifting unit 33 of the first embodiment of the present invention. The shift wire releasing assembly 41' basically includes a modified shift release lever 45' with the release pawl 46, the shift release lever return spring 47 and a modified shift release lever control plate 48'. Thus, the shift position control mechanism 43' is identical to the shift position control mechanism 43 of the first embodiment, except that the shift release lever 45, the shift release lever control plate 48 and the resistance providing structure 49 of the first embodiment have been replaced with the modified shift release lever 45', the modified shift release lever control plate 48' and the modified resistance providing structure 49' as explained below. In view of the similarities between the first and second embodiments, the parts of the second embodiment that are identical to the first embodiment will be indicated with the same reference numerals. Moreover, the descriptions of the common parts will be omitted for the sake of brevity.

The modified shift release lever 45' basically includes an internal mounting portion 45a', an external rider operating portion 45b', a mounting tab 45c', a stop flange 45d' and control or camming surface 45e'. The modified shift release lever 45' is identical to the shift release lever 45 of the first embodiment, except for the addition of the control surface 45e'. The control surface 45e' forms a part of the resistance providing structure 49' of the second embodiment. The control surface 45e' has a rest portion RP, a first resistance portion R1, an uprising cam portion C and a second resistance portion R2.

The modified shift release lever control plate 48' is preferably a flat plate with a center opening 48a' that is keyed such that it engages the upper post 40c to prevent rotational movement therebetween. The modified shift release lever control plate 48' also has a hole 48b' for receiving the second end 47b of the shift lever return spring 47 therein. A stop member or flange 48c' is formed on the outer periphery of the modified shift release lever control plate 48' to act as a stop for the modified shift release lever 45'. In particular, the stop flange 45*d'* of the modified shift release lever 45' is normally biased against the stop member 48*c'*. The modified shift release lever control plate 48' is also provided with an L-shaped mount flange 48*d'* for coupling the resistance providing structure 49' thereto.

The modified resistance providing structure 49' basically includes a biasing element or compression spring 49*a'* and a resistance adding or indexing pawl 49*b'* with the indexing pawl 49*b'* being pivotally mounted to the shift release lever control plate 48' by a pivot pin 49*c'*. The compression spring 49*a'* is installed between the free end of L-shaped mount flange 48*d'* of the shift release lever control plate 48' and the indexing pawl 49*b'* such that the compression spring 49*a'* urges the indexing pawl 49*b'* into contact with the control surface 45*e'* of the modified shift release lever 45'. The control surface 45*e'* forms a part of the resistance providing structure 49' of the second embodiment.

In other words, control surface 45*e'* of the modified shift release lever 45' forming a first contact portion or an abutment. The indexing pawl 49*b'* forms a second contact portion of the resistance providing structure 49' with a first end of the indexing pawl 49*b'* contacting the control surface 45*e'* of the modified shift release lever 45' and a second end of the indexing pawl 49*b'* operatively engaged with the biasing element or compression spring 49*a'*. Thus, in this embodiment, the indexing pawl 49*b'* is a pivotally mounted member of the resistance providing structure 49'.

By providing the shift wire releasing assembly 41 with the resistance providing structure 49', the user can determine when a shift has occurred during operation of the shift release lever 45'. In other words, the shift wire releasing assembly 41' is configured and arranged such that the rider can easily operate the shift release lever 45' to perform a shifting operation and readily detect when a completion of a shift operation occurs.

Figure 40:
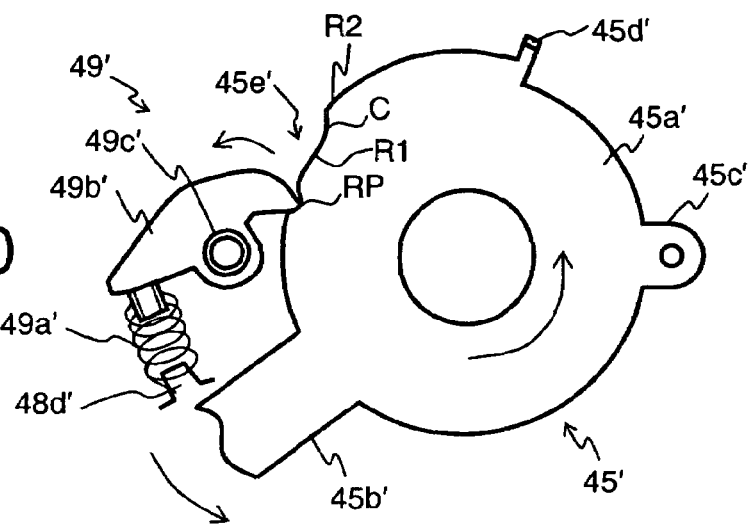
FIG. 40 is a simplified top plan view of a selected parts forming the modified resistance providing structure in accordance with the second embodiment of the present invention.
Figure 41:
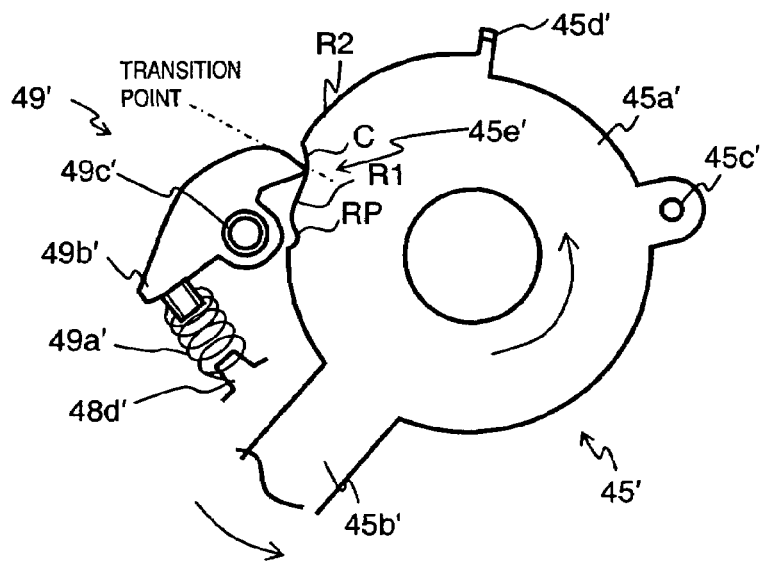
FIG. 41 is a simplified top plan view of the selected parts forming the modified resistance providing structure shown in FIG. 40 when the shift release lever has completed a first shift operation.
Figure 42:
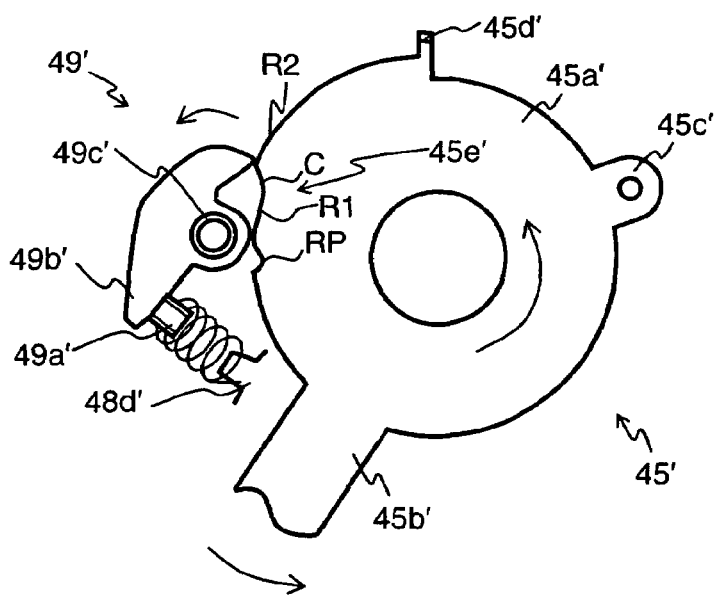
FIG. 42 is a simplified top plan view of the selected parts forming the modified resistance providing structure shown in FIGS. 40 and 41 when the shift release lever started a second shift operation in a single progressive movement of the shift release lever.

When the shift release lever 45' is in the rest position as seen in FIG. 40, the indexing pawl 49*b'* contacts the rest portion RP of the control surface 45*e'*. Then, when the shift release lever 45' is moved from the rest position to a shift release position, the indexing pawl 49*b'* rides along the control surface 45*e'* from the rest portion RP of the control surface 45*e'* to the first resistance portion R1 of the control surface 45*e'*. When the shift release lever 45' is moved such that the indexing pawl 49*b'* starts to ride along uprising cam portion C of the control surface 45*e'*, a first shift operation has been completed with the turning resistance of the shift release lever 45' as seen in FIG. 41. After a first shift operation has been completed, the spring 49*a'* is compressed by the rotation of the indexing pawl 49*b'*. Thus, the change in resistance on the shift release lever 45' due to the compression of the spring 49*a'* by the indexing pawl 49*b'*, which is felt by the rider to indicate that a first shift operation has been completed and the start of a second shift operation. Once the indexing pawl 49*b'* rides past the uprising cam portion C of the control surface 45*e'*, the indexing pawl 49*b'* rides on the second resistance portion R2 where a second shift operation occurs after a predetermined amount of movement.

Accordingly, in this embodiment, the control surface 45*e'* of the shift release lever 45' (operating member) and the indexing pawl 49*b'* are further configured and arranged to provide a first resistance during the first range of movement of the shift release lever 45' (operating member) from the first position toward the second position and a second resistance that is larger than the first resistance during the second range of movement of the shift release lever 45' (operating member) from the first position toward the second position, with a sudden change in resistance occurring at the transition point between the first and second ranges during movement of the shift release lever 45'. Thus, the control surface 45*e'* of the shift release lever 45' (operating member) forms a first contact portion of the resistance providing structure 49', while the indexing pawl 49*b'* forms a second contact portion, with contact occurring between the first and second contact portions when the shift release lever 45' (operating member) moves from the rest (first) position toward the shift (second) position such that increased resistance occurs in operating the shift release lever 45' (operating member). In other words, the resistance providing structure 49' is configured and arranged to provide separate resistance from bicycle shift position control mechanism 43 so that the riders knows when a first shift operation has been completed.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle shift control mechanism comprising:
   an operating member movable between a first position and a second position to perform multiple gear shifts in a single progressing movement of the operating member;
   a wire take up member configured and arranged to rotate about a rotational axis in response to movement of the operating member;
   a positioning member configured and arranged to rotate with the wire take up member;
   a position maintaining member configured and arranged to selectively hold the positioning member in one of a plurality of predetermined shift positions; and
   a resistance providing structure including a first contact portion and a second contact portion, with contact occurring between the first and second contact portions when the operating member moves from the first position toward the second position to provide increased resistance in operating the operating member and a first gear shift of the multiple gear shifts is completed, and the resistance providing structure being configured and arranged to provide separate resistance from the positioning member and the position maintaining member.

2. A bicycle shift control mechanism comprising:
   an operating member movable between a first position and a second position;

a wire take up member configured and arranged to rotate about a rotational axis in response to movement of the operating member;

a positioning member configured and arranged to rotate with the wire take up member;

a position maintaining member configured and arranged to selectively hold the positioning member in one of a plurality of predetermined shift positions; and a resistance providing structure including a first contact portion and a second contact portion, with contact occurring between the first and second contact portions when the operating member moves from the first position toward the second position to provide increased resistance in operating the operating member, and the resistance providing structure being configured and arranged to provide separate resistance from the positioning member and the position maintaining member, the operating member and the resistance providing structure being further configured and arranged to form a transition point between a first range of movement of the operating member and a subsequent second range of movement of the operating member, with the transition point corresponding to a completed shift operation occurring between the positioning member and the position maintaining member in which the positioning member moves from one of the predetermined shift positions to a next adjacent one of the predetermined shift position.

3. The bicycle shift control mechanism according to claim 2, wherein the operating member and the resistance providing structure are further configured and arranged to provide a first resistance during the first range of movement of the operating member from the first position toward the second position and a second resistance that is larger than the first resistance during the second range of movement of the operating member from the first position toward the second position, with a sudden change in resistance occurring at the transition point between the first and second ranges during movement of the operating member.

4. The bicycle shift control mechanism according to claim 2, wherein the first contact portion includes an abutment that is moved with the movement of the operating member, and the second contact portion includes a biasing element that is engaged by the abutment at the transition point between the first and second ranges during movement of the operating member.

5. The bicycle shift control mechanism according to claim 1, wherein the first contact portion includes an abutment that is moved with the movement of the operating member, and the second contact portion includes a biasing element that is operatively engaged by the abutment at an intermediate position between the first and second positions during movement of the operating member from the first position toward the second position.

6. The bicycle shift control mechanism according to claim 5, wherein the biasing element of the second contact portion is a torsion spring with one end of the torsion spring being arranged to be engaged by the abutment when the operating member is located at the intermediate position.

7. A bicycle shift control mechanism comprising:

an operating member movable between a first position and a second position;

a wire take up member configured and arranged to rotate about a rotational axis in response to movement of the operating member;

a positioning member configured and arranged to rotate with the wire take up member;

a position maintaining member configured and arranged to selectively hold the positioning member in one of a plurality of predetermined shift positions; and a resistance providing structure including a first contact portion and a second contact portion, with contact occurring between the first and second contact portions when the operating member moves from the first position toward the second position to provide increased resistance in operating the operating member, and the resistance providing structure being configured and arranged to provide separate resistance from the positioning member and the position maintaining member, the first contact portion including an abutment that is moved with the movement of the operating member, and the second contact portion including a biasing element that is operatively engaged by the abutment at an intennediate position between the first and second positions during movement of the operating member from the first position toward the second position and an indexing pawl with a first end of the indexing pawl contacting a cam surface of the operating member and a second end of the indexing pawi operatively engaged the biasing element, with the cam surface of the operating member including the abutment.

8. The bicycle shift control mechanism according to claim 7, wherein the indexing pawl is a pivotally mounted member.

9. The bicycle shift control mechanism according to claim 7, wherein the biasing element of the second contact portion is a compression spring.

10. The bicycle shift control mechanism according to claim 1, wherein the operating member includes a pivotally mounted lever with a mounting portion and a rider operating portion.

11. The bicycle shift control mechanism according to claim 10, wherein the operating member includes a biasing member that is coupled to the lever to normally urge the lever from the second position to the first position.

12. The bicycle shift control mechanism according to claim 11, wherein the wire take up member is urged in a first rotational direction by a release biasing member, and the operating member includes a release pawl that is configured to move the position maintaining member to release the positioning member and the wire take up member in response to movement of the operating member from the first position toward the second position such that the positioning member and the wire take up member is rotated in the first rotational direction by the release biasing member.

13. A bicycle shift control mechanism comprising:

an operating member movable between a first position and a second position;

a wire take up member configured and arranged to rotate about a rotational axis in response to movement of the operating member;

a positioning member configured and arranged to rotate with the wire take up member;

a position maintaining member configured and arranged to selectively hold the positioning member in one of a plurality of predetermined shift positions; and a resistance providing structure including a first contact portion and a second contact portion, with contact occurring between the first and second contact portions when the operating member moves from the first position toward the second position to provide increased resistance in operating the operating member, and the resistance providing structure being configured and arranged to provide separate resistance from the positioning member and the position maintaining member, the operating member being configured and arranged to selectively release the positioning member from the position maintaining member to cause the positioning member to rotate one shift position of the predetermined shift positions when the operating member is moved a first predetermined amount and to cause the positioning member to rotate two consecutive shift positions of the predetermined shift positions when the operating member is moved a second predetermined amount in a single shift operation.

14. The bicycle shift control mechanism according to claim 1, wherein
the operating member is configured and arranged to rotate about the rotational axis of the wire take up member.

15. A method for multiple shifting of a bicycle shift control mechanism comprising:
rotating a shifting lever in a first rotational direction from a first position toward a second position for causing a first shift to occur before passing an intermediate position between the first position and the second position;
providing an increased resistance in rotating the shift lever at the intermediate position between the first position and the second position to indicate completion of the first shift;
further rotating the shift lever past the intermediate position to the second position for causing a second shift to occur; and
releasing the shift lever such that the shift lever returns to the first position without shifting occurring during in the releasing of the shift lever.

16. The method according to claim 15, wherein
the providing of the increased resistance in rotating the shift lever at the intermediate position is performed by providing a first resistance during a first range of movement of the shift lever from the first position to the intermediate position and a second resistance that is larger than the first resistance during a second range of movement of the shift lever from the intermediate position to the second position, with a sudden change in resistance occurring at the intermediate position between the first and second ranges during movement of the shift lever.

17. The method according to claim 15, wherein
the providing of the increased resistance in rotating the shift lever at the intermediate position is performed by providing an abutment that is moved with the shift lever, and a biasing element that is engaged by the abutment at the intermediate position during movement of the shift lever.

18. The method according to claim 15, wherein the providing of the increased resistance in rotating the shift lever at the intermediate position is performed by providing an indexing pawl with a first end of the indexing pawl contacting a cam surface of the shift lever and a second end of the indexing pawl operatively engaging a biasing element, with the cam surface of the shift lever.

* * * * *